United States Patent [19]

Bernstein

[11] Patent Number: 4,949,943

[45] Date of Patent: Aug. 21, 1990

[54] MULTIPLE AIR CYLINDER CLAMP FOR VISE

[75] Inventor: Leon M. Bernstein, Minneapolis, Minn.

[73] Assignee: Kurt Manufacturing Company, Inc., Minneapolis, Minn.

[21] Appl. No.: 377,710

[22] Filed: Jul. 10, 1989

[51] Int. Cl.[5] ................................................ B23Q 3/08

[52] U.S. Cl. ........................................ 269/32; 269/136

[58] Field of Search ........................ 269/20, 25, 27, 32, 269/31, 221, 246; 92/146, 128

[56] References Cited

U.S. PATENT DOCUMENTS

| | | |
|---|---|---|
| 2,415,783 | 2/1947 | Bassett et al. . |
| 3,057,205 | 10/1962 | Howard et al. . |
| 3,603,579 | 9/1971 | Odom . |
| 3,713,364 | 1/1973 | Francia . |
| 3,911,790 | 10/1975 | Gaitten . |
| 3,968,735 | 7/1976 | Boisde et al. . |
| 3,978,884 | 9/1976 | Sundström . |
| 4,070,010 | 1/1978 | Brasca . |
| 4,223,879 | 9/1980 | Wolfe et al. . |
| 4,281,825 | 8/1981 | Chiang . |
| 4,773,636 | 9/1988 | Takahashi ............................ 269/32 |

OTHER PUBLICATIONS

Russian Publication, p. 93, Published 1973.

Russian Publication, p. 193, Published 1960.

*Primary Examiner*—Robert C. Watson

*Attorney, Agent, or Firm*—Kinney & Lange

[57] ABSTRACT

The present invention relates to a modular, multiple actuator assembly for providing a clamping force on a machine tool vise or other clamp which includes a plurality of parallel operating pistons and cylinders providing an additive force to a movable clamp jaw. The modular assembly can be installed easily in existing vises as well as in new vises. The modular actuator has a number of individual piston-cylinder assemblies acting to be additive in force so a high clamping force can be obtained using standard air pressure supplies found in machine tool shops and factories.

4 Claims, 3 Drawing Sheets

MULTIPLE AIR CYLINDER CLAMP FOR VISE

BACKGROUND OF THE INVENTION

1. Field of the Invention

The present invention relates to fluid pressure actuated clamps, specifically multiple pressure actuated cylinders for machine vise jaws.

2. Description of Prior Art

Various fluid pressure actuated vises have been known in the prior art. For example, U.S. Pat. No. 4,223,879, issued to Ingo Wolf, and assigned to the same assignee as the present application, shows a hydraulic vise of basic design. The present application is an improvement to provide multiple, modular parallel operated additive load applying actuators for increasing clamping forces.

There have been multiple piston actuators such as that shown in U.S. Pat. No. 3,911,790, which are interlocked for operation.

U.S. Pat. No. 3,603 579 shows a vise that has a tandem operating movable jaw, utilizing both hydraulic and air pistons for final clamping of the movable jaw. The device, however, does not show modular, parallel operated, additive load applying cylinders, as with the present device.

U.S. Pat. No. 4,281,825 shows a manual hydraulically operated vise, with a bore formed in the vise body, and having an actuating piston. U.S. Pat. No. 4,070,.010 shows a vise that has a movable jaw operated with a fluid pressure cylinder and which has a pressure intensifier type piston operated in a second cylinder to increase the available pressure. The cylinders are not parallel acting. The intensifier boosts effective actuating pressure to the operating cylinders.

Additional patents which show multiple pistons but which operate in different manners in the present device are shown in U.S. Pat. Nos. 3,978,884; 3,968,735; 3,713,364; 3,057,205; and 2,415,783.

None of these patents show the concept of a pressure actuator which is adaptable to be easily mounted in a bore on an end wall of a vise and comprising a modular, multiple fluid pressure actuator that act together to provide additive force.

SUMMARY OF THE INVENTION

A fluid pressure operated clamp, comprising a machine tool vise has an actuator assembly which can be used for applying force to an actuator shaft of a vise (either a screw or other type of actuator), and coupled easily and conveniently to the vise body. Preferably, the actuator comprises a plurality of modular piston-cylinder assemblies arranged in line, and pressurized in parallel to provide an additive force to the vise actuator. The actuator has a base actuator housing with a hub which is inserted into a bore in an end wall of a standard multipurpose vise body, and which can be provided as a kit to existing vises merely by replacing the normal vise screw with a screw for coupling to an actuator.

The actuator assembly is easily placed in vises that have a proper size bore in one end wall, and once in place and connected to a fluid pressure supply, the actuator assembly provides an adequate amount of clamping force for most machine tool applications. The modular piston-cylinder assemblies of the preferred embodiment provide additive forces so an existing plant air supply can be used and a sufficient clamp force will be developed.

The modular assembly permits changing of the number of cylinder-piston assemblies utilized for a given operation, and when, as shown, five of the units are in place, an adequate force for most machine tool operations can be obtained using normal air pressure levels. The individual cylinder-piston assemblies can be modularly removed or added to achieve the desired total force capability for the machine vise.

DETAILED DESCRIPTION OF THE PREFERRED EMBODIMENTS

Figure 1:
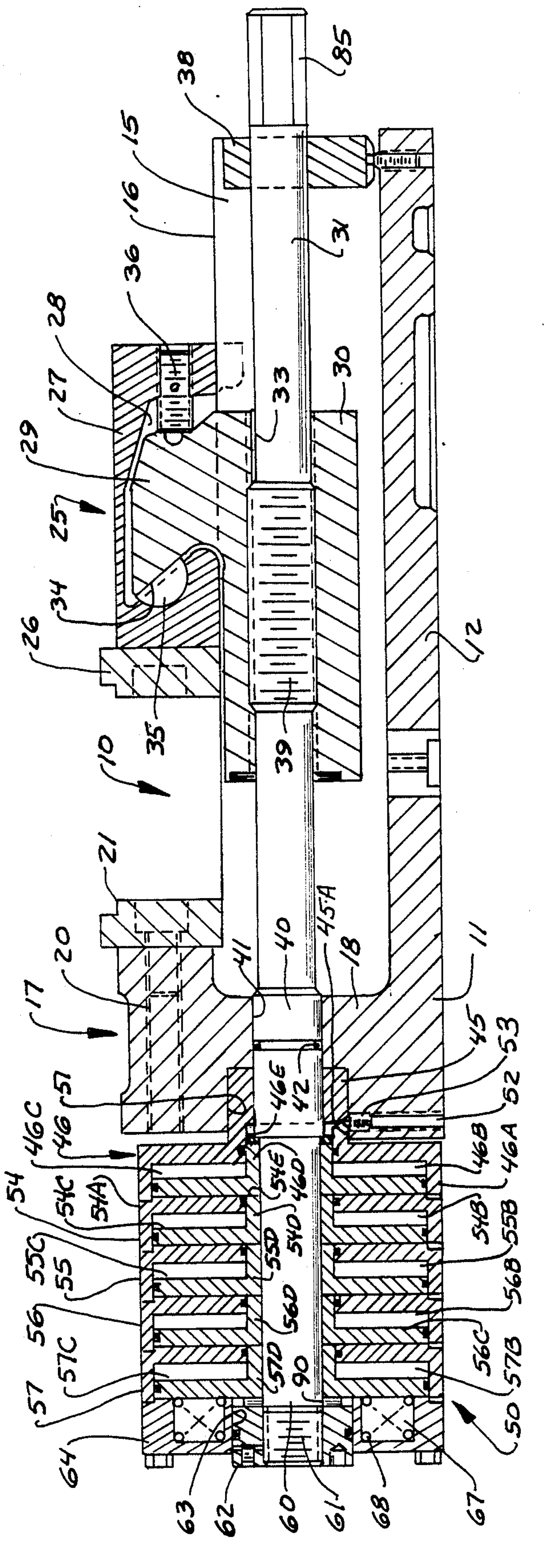
FIG. 1 is a vertical sectional view through a typical machine tool vise with which the present invention is utilized.

Referring to the drawings and the numerals of reference thereon, a vise 10 includes a body shown generally at 11 that has a base wall 12, and which may be constructed in a desired manner, generally as that shown in U.S. Pat. No. 4,223,879. A pair of upstanding side walls 14,14 (FIG. 3) are connected to the base wall 12 and extend uprightly therefrom, and have upper end rails 15,15 thereon which are used in a conventional manner for providing ways or rail surfaces 16 on which a movable vise jaw assembly can be mounted.

As shown, at the base or fixed jaw end of the vise, there is an end wall 18 that extends laterally across the vise. A fixed jaw 20 is mounted or integrally formed on the vise body at the end wall 18. End wall 18 has sufficient thickness in the longitudinal direction of the vise to support the actuator, which will be placed on the wall. The fixed jaw 20 comprises a block that has a fixed jaw plate 21 mounted thereon with suitable cap screws in a conventional manner with the fixed jaw plate resting on the rail surfaces 16 of the two rails Additionally, the vise assembly has a movable jaw assembly 25 that has a jaw plate 26 mounted thereon in a conventional manner facing the jaw plate 21, to form the clamp jaws of the vise. The movable jaw assembly 25 includes an outer housing 27 that has an inner recess 28 into which a head 29 of a traveling nut 30 is mounted. The traveling nut 30 acts through the head 29 to move the movable jaw when a vise screw 31 is rotated to move the nut in longitudinal direction. There is a drive between a threaded inner bore 33 of the traveling nut 30, and a thread section 39 on the vise screw 31.

The head 29 fits into the recess 28 and has an inclined surface 34 that bears against a part-spherical drive member 35 that nests in a receptacle in an inner surface of the recess 28 at the forward end of the recess. Forces tending to move the movable jaw housing 27 toward the fixed jaw for clamping parts are applied through the part spherical member 35. A set screw 36 bears against the back side of the head 28 to cause the housing 27 to move with the nut in direction away from the fixed jaw.

This jaw nut and housing is a conventional arrangement as shown in U.S. Pat. No. 4,223,879.

The vise screw 31 is supported in a suitable block 38 at the rear or remote end of the vise body 11. In addition to the threaded section 39, the vise screw has a portion 40 that fits into a bore 41 in the end wall 18. An O-ring 42 seals the bore 41. The portion 40 is of larger diameter than the main section of the vise screw and is supported in the end wall 18. The larger diameter portion 40 also extends through a bore in a hub 45 of a base piston-cylinder assembly indicated generally at 46 of a modular actuator assembly 50. The hub 45 is made to fit into a bore 51 formed in the end wall 18 to provide a removable, but snug fit. The hub 45 is held in place in the bore 51 with a set screw 53 that is threaded through a bore 52 extending upwardly from the bottom of the vise body and opening to the bore 51. The hub 45 has an exterior lock groove or receptacle 45A into which the end of set screw 53 fits. The end of screw 53 bears against a side of receptacle 45A to seat the end of hub 45 against an end wall of the bore 51.

The modular actuator assembly 50, in addition to the base piston-cylinder assembly 46, has a plurality of modular piston-cylinder assemblies indicated generally at 54, 55, 56, and 57. The vise screw 31 has an integral shank portion 60 which extends through provided hubs on each of the pistons used with the respective piston-cylinder assemblies 46 and 54, 55, 56 and 57. Shank portion 60 extends outwardly beyond the outer end of the piston-cylinder assembly 57. The shank portion 60 has a threaded end 61 thereon on which a nut 62 is threadably attached. The nut 62, as shown, has a cylindrical outer surface that has a slide fit in a central bore 63 on an end cap 64 of the modular actuator assembly 50. An O-ring seals the nut relative to the bore 63.

The base cylinder-piston assembly 46 includes a cylinder housing 46A integral with the hub 45. The cylinder housing 46A has an outer annular flange that defines an interior cylinder chamber 46B in which a generally flat or plate-like piston 46C is mounted. Piston 46C has a hub 46D which fits over the shank portion 60 of the screw 31.

Figure 2:
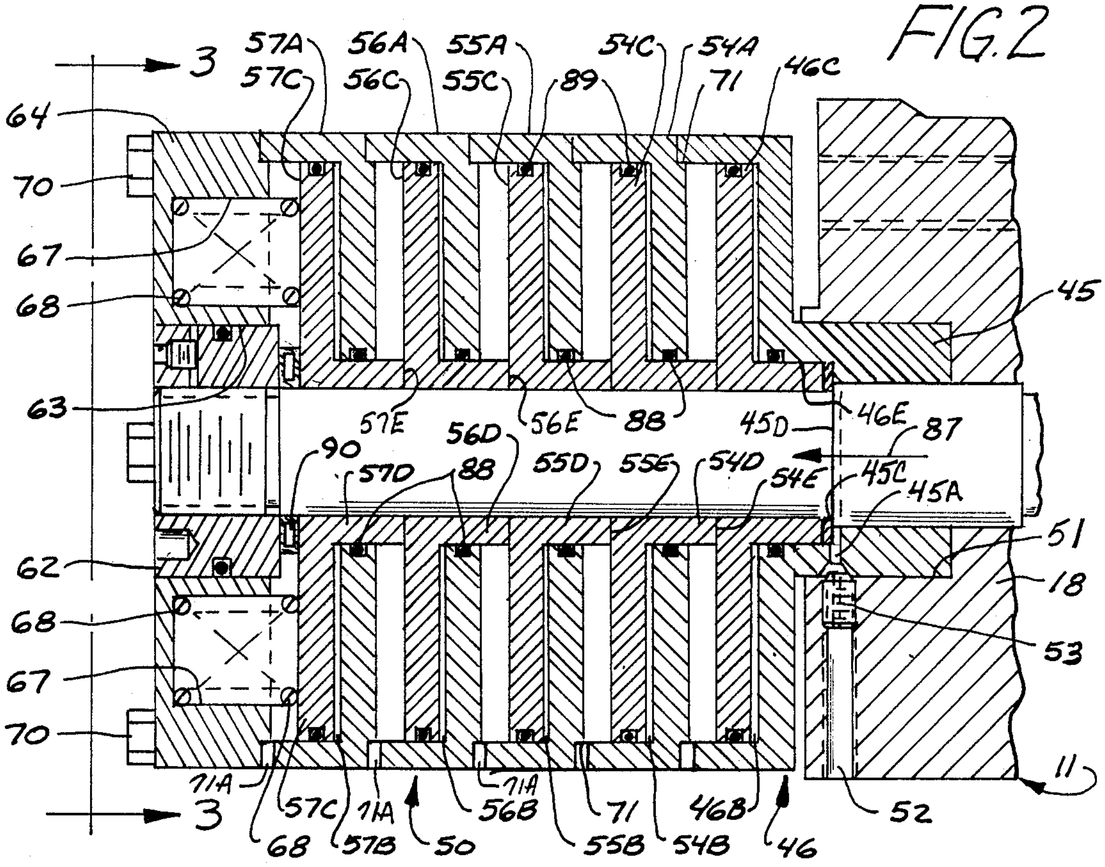
FIG. 2 is an enlarged sectional view of the modular cylinder-piston assemblies used with the present invention.

Each of the modular or secondary piston-cylinder assemblies 54–57 comprises an outer cylinder housing 54A–57A that has a base wall perpendicular to the axis of the screw 31, with a bore therein that fits over a hub 54D–57D of a generally flat or plate-like piston member 54C–57C of the respective piston-cylinder assembly. Each of the hubs 54D–57D fits over the shank portion 60 of the vise screw, and the inner end of each of the hubs 54D–57D abuts against the piston immediately to its right as shown in FIGS. 1 and 2. The hub 46D fits into a bore 46E of the cylinder assembly 46. Bore 46E is counter bored into the hub 45. An end surface 54E of the hub 54D extends through the base wall of its cylinder 54A and bears on an outer surface of piston 46C. An end 55E of the hub 55D bears against piston 54C; an end 56E of the hub 56D bears against piston 55C; and an end 57E of hub 57D bears against the piston 56C. End cap 64, as shown, has a plurality of recesses or bores 67 therein spaced from its axis, each of which carries a spring 68 to tend to urge the pistons back toward the vise body.

Figure 3:
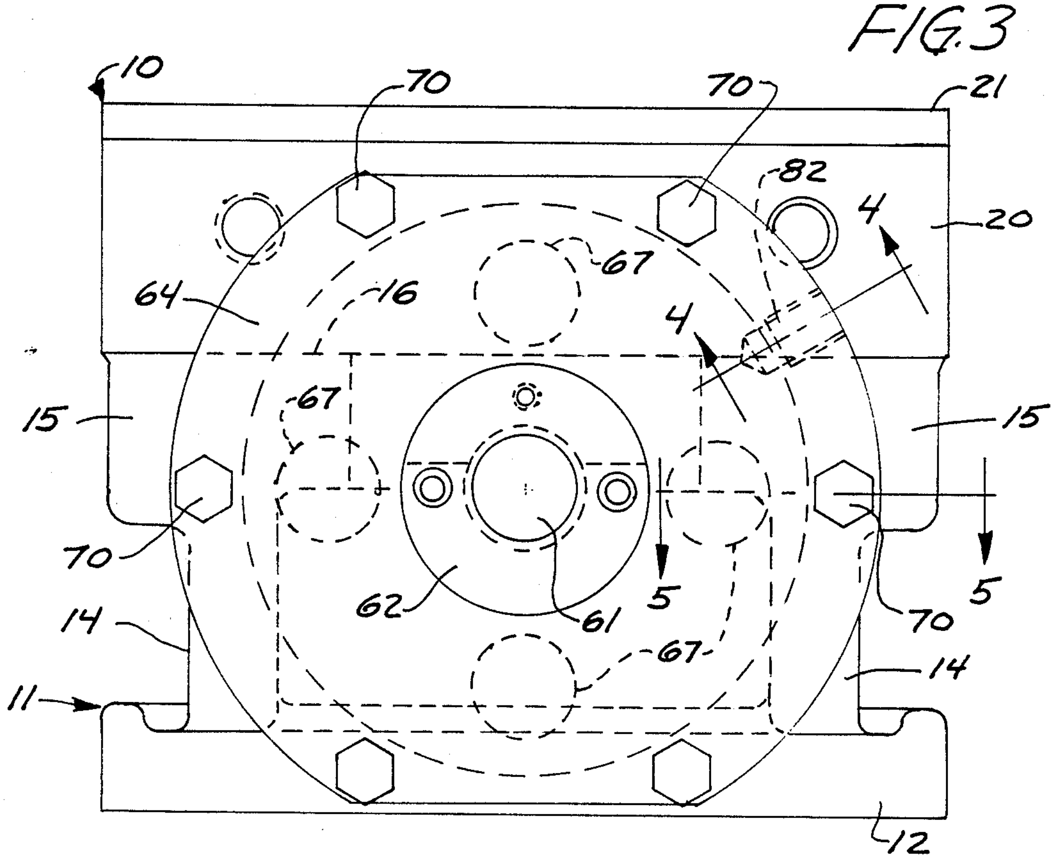
FIG. 3 is an end view of the device of FIG. 2 taken as on line 3—3 in FIG. 1.
Figure 4:
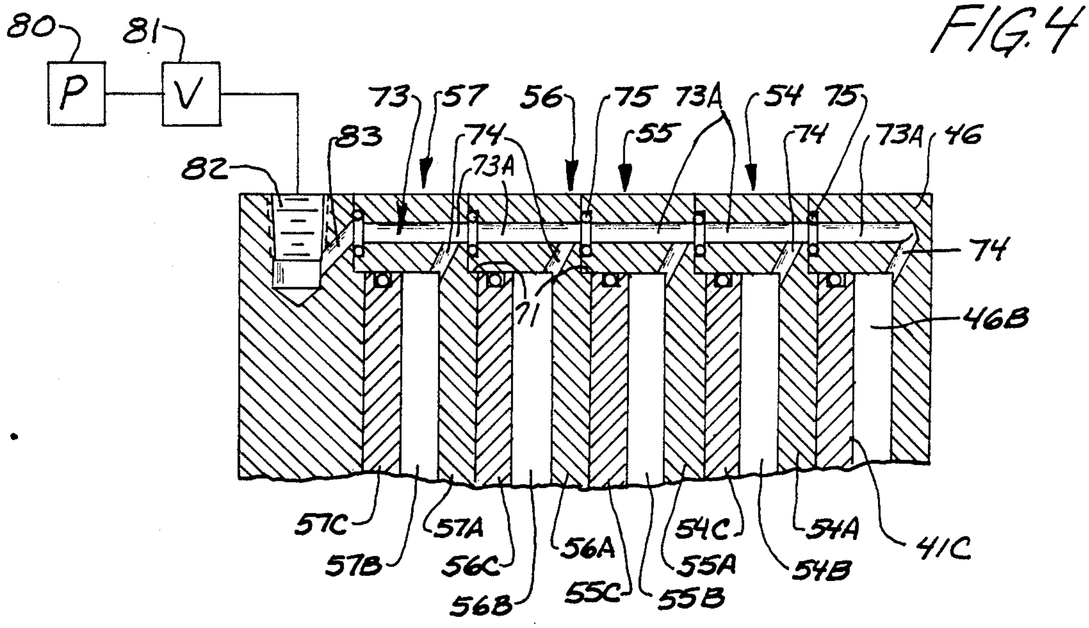
FIG. 4 is a fragmentary sectional view taken as on line 4—4 in FIG. 3.
Figure 5:
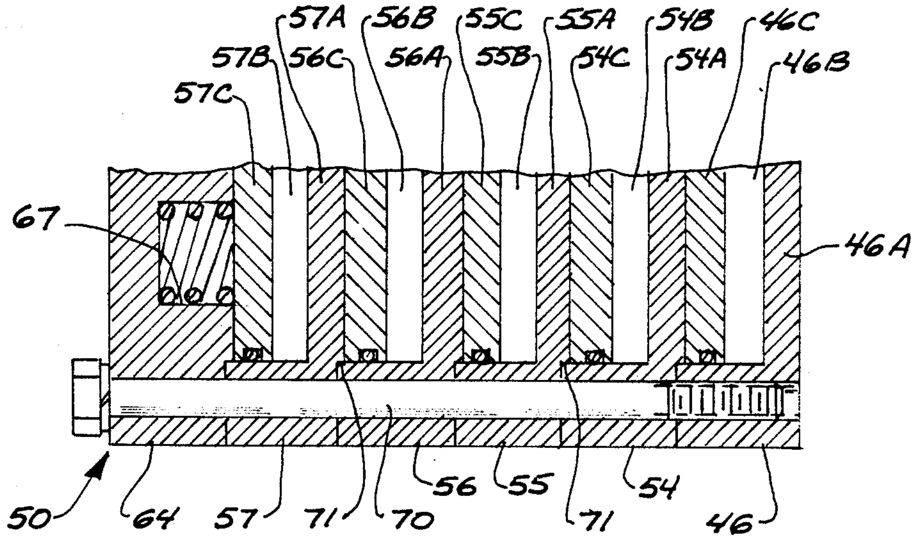
FIG. 5 is a sectional view taken as on line 5—5 in FIG. 3.

As shown, the modular actuator assembly 50 is held together with cap screws 70 that pass through outer portions of the cap 64 and the modular cylinders, as shown in FIGS. 3 and 5. Cap screws 70 are threaded into the wall of the base cylinder section 46 as shown in FIG. 5. The piston-cylinder assemblies or modules 54–57 can be removed or replaced, if desired. It should also be noted that the annular walls of each of the cylinder housings pilot into the bore of the next adjacent cylinder housing. An annular shoulder 71 is made on the outer side of each cylinder housing to pilot into the next adjacent cylinder bore, as shown in FIGS. 3, 4 and 5. When the piston-cylinder modules are stacked together they are in alignment (coaxial), and if one or more of the piston-cylinder assemblies are removed, the cap screws 70 are merely shortened appropriately.

Each of the cylinder housings 46A and 54A–57A has a narrow radial groove 71A at its outer end where the shoulder 71 fits as can be seen at the lower side of the cylinder housing in FIGS. 1 and 2. The radial grooves relieve compressed air in the chambers on the back side of the pistons.

By referring to FIG. 4 it can be seen that the annular wall of each of the cylinder housings has a short axial bore segment 73A therein. An in-feed bore 74 joins each bore segment 73A to the respective chamber 46B and 54B–57B. O-ring seals 75 are provided in outwardly facing annular recesses around the passageway segments 73A on the outer face of each of the annular cylinder walls so that when the piston-cylinder modular assemblies are placed together, a continuous passageway 73 is formed from the individual segments 73A and each of the chambers will receive fluid under pressure through the respective bore 74.

Fluid under pressure is provided from a pressure source 80 through a valve 81 of conventional design to connecting bores 82 and 83 that are formed in the end cap 64.

A small axial bleed hole 45A is provided through the hub 45 from the bore 46E, in which piston hub 46D slides, to the hole 52 for the set screw 53. The set screw 53 is also provided with an axial bleed hole through its center. The hole 45C and the axial hole in set screw 53 will provide pressure relief behind the piston hub 41D of the base piston-cylinder assembly 46. As the piston 46C slides air can then bleed in or out of the hole 45A and the hole in set screw 53.

A hardened thrust washer 45C fits over shank 60 and engages the shoulder 45D between screw portion 460 and screw shank portion 60. The thrust washer fits into bore 46E and the end of piston hub 46D bears on the washer to protect the end of the piston hub 46D from wearing by the shoulder 45D during use.

In FIG. 3, all of the pistons 46C and 54C–57C are in a retracted position, that is, springs 67 have forced the pistons and the vise screw all the way to the right relative to the outer cylinder housings 46A and 54A–57A. This then moves the vise screw all the way to the open or release position. When the vise is to clamp a piece part between the jaw plates 21 and 26, the vise screw 31 is rotated using a drive at the end 85, in a conventional manner, to move the movable jaw assembly through the screw drive toward the fixed jaw plate 21. A clamp preload can be applied manually by turning the vise screw 31, and then if the final clamping load is to be done with pneumatic cylinder actuation, valve 81 is operated to provide fluid under pressure to the bores 73A and 74, in parallel. Bores 74 carry fluid under pressure, therefore, to the individual actuator chambers 46B and 54B–57B between the base wall of the respective cylinder housings and the piston that moves in such cylinder chamber. A force is thus provided by each of the pistons acting to move the vise screw axially in the direction indicated by the arrow 87, to tend to tighten the movable jaw assembly against a part and against the fixed jaw. It can be seen that the forces provided by the pistons will be additive, in that the piston 46C bears against the interface 54E of the hub 54D, and in turn, each of the pistons 54C–56C bears against the ends 55E–57E of the hubs 55D–57D. The end piston 57C acts to compress the springs 68 and exert force on nut 62 through a thrust bearing 90 so that the pistons and vise screw 31 will move to the position as shown in FIG. 1, which is the extreme tightened position. The thrust bearing 90 carries the axial loads and also make it possible to build axial force by rotating the screw using a hand crank at drive 85 between the face of the piston 57C and nut 62.

The hubs 46D and 54D–57D are each sealed with suitable O-rings in the bores in which they slide, as shown at 88, and also the hub 46D is sealed in the bore of 46E. Likewise, the outer peripheries of the pistons have O-ring pressure seals as well.

The total clamping force is additive from each of the piston-cylinder assemblies, because of the mechanical compression carrying connection between the hubs of one piston against the face of the next adjacent inwardly positioned piston.

The modular actuator assembly 50 can easily be removed and replaced with a different modular actuator assembly, or with a different type of screw drive, by releasing the set screw 53, taking off the outer nut 62 from the threaded end of the vise screw and removing the actuator assembly.

The vise screw can be removed as well and replaced with a different type of screw for a different type of actuator or the vise screw can be replaced with a manually operated screw merely by putting a thrust bearing in the bore 51 and using a screw that has an end nut that threads onto the end of the vise screw and bears against the thrust bearing to carry axial tension loads in the screw back to the end wall 18 of the vise.

There is no alignment problem with the modules because of individual forces between a plurality of cylinders, because the individual pistons act independently, and merely act through a bearing connection or compression carrying connection to add the force provided by one piston to the next piston in series.

A three-way valve 91 is used for control because the actuators are single-acting, and the valve will either provide pressure to the actuators or exhaust air from the actuators.

Because of the modular design having a separate module for each individual piston-cylinder assembly, any piston-cylinder assembly can be replaced if it becomes worn or damaged, and others can be added on as previously stated. The modular form can be used for any type of clamping device because it is very compact and even where limited space is available, it can easily be used.

Each section gives a known clamping force because of the piston area is known and the supply pressure is also relatively easily controlled. Thus, if the total amount of clamping force desired is known, it can be achieved by selecting the piston size, as well as the number of the piston-cylinder assemblies that are used.

Although the present invention has been described with reference to preferred embodiments, workers skilled in the art will recognize that changes may be made in form and detail without departing from the spirit and scope of the invention.

What is claimed is:

1. A multi-stage modular actuator assembly for attachment to a rotatable vise screw for operating a machine vise that has a main body, a fixed jaw at one end of the body and a movable jaw slidably mounted on the frame, the vise screw having a screw section for driving the movable jaw upon rotation of the vise screw and having a shaft portion linearly slidable relative to the body for moving the movable jaw relative to the fixed jaw, said vise body having a support at the end adjacent the fixed jaw for mounting the modular actuator assembly thereon for carrying and causing tension loads in said vise screw to clamp the movable jaw toward the fixed jaw, said modular actuator assembly comprising:

a base cylinder housing having an attachment member adapted to be mounted onto the body and restrained from movement relative to the body for reacting tension loads in the vise screw, said base cylinder housing including a cylinder base wall extending generally radially from a longitudinal axis of the vise screw shaft, and an annular wall defining an interior cylinder chamber, said cylinder base wall having an axial opening therein for receiving the vise screw shaft, and a base piston mounted in the chamber of said base cylinder housing, said base piston having a piston wall generally parallel to the cylinder base wall and sealingly mounted in the chamber, said vise screw shaft extending through the base piston and said base piston having a seated position against the base cylinder housing;

at least one secondary piston-cylinder assembly comprising a secondary cylinder housing having a secondary cylinder base wall extending radially from the axis of shaft on which the modular assembly is mounted, said secondary cylinder housing abutting the base cylinder housing for reacting tension loads in said vise screw and having a secondary chamber defined therein and enclosed by an annular wall, a secondary piston slidably mounted in the secondary chamber said secondary piston having a secondary piston wall extending generally radially from a shaft on which it is mounted and parallel to the secondary cylinder base wall, said secondary piston having a secondary piston hub surrounding the vise screw shaft and slidably mounted through an opening in the secondary cylinder wall, said secondary piston hub being of length so that when the base cylinder housing and the secondary cylinder housing are clamped together the secondary piston hub will engage the base piston for carrying compressive loads therebetween;

an outer end wall mounted to enclose the chamber of the secondary cylinder housing, the vise screw shaft extending outwardly through the outer wall;

a nut mounted on the vise screw shaft on a portion of the vise screw shaft extending outwardly from the outer wall, said nut bearing against an outermost secondary piston wall under tension loads in the vise screw and being slidable relative to the outer wall and, said vise screw shaft being rotatable relative the cylinder housings and the outer end wall; and means to provide fluid pressure in parallel to the chambers of the cylinder housings simultaneously, and on the same sides of the respective piston in such chambers to apply tension force to the vise screw shaft which is additive for the forces generated by the base and secondary cylinders and pistons.

2. The actuator assembly as specified in claim 1 and spring means reacting against the outer end wall for urging said base piston and said secondary piston in an opposite direction from the direction of urging of the fluid pressure.

3. The multi-stage modular actuator assembly of claim 1 wherein there are a plurality of secondary piston-cylinder assemblies, each having a secondary cylinder housing and a secondary piston in the housing, the secondary cylinder housings being identically mountable in series extending in a direction away from the base cylinder housing to permit selecting the number of secondary cylinder housings used, and each secondary piston including a secondary piston hub slidably surrounding the vise screw shaft, and the hubs being slidably mounted through an opening in the respective secondary cylinder wall and of length so that when the base cylinder and all of the secondary cylinder housings are clamped together the secondary piston hubs engage an adjacent piston hub and the base piston, respectively, for carrying compression forces, the outer wall being on an outermost one of the secondary cylinder housings.

4. The multi-stage modular actuator assembly of claim 1 wherein the support for mounting the modular actuator assembly on the main body comprises a recess defined in the main body and forming a shoulder facing outwardly from the main body, and a hub formed on the base cylinder housing to fit within said recess and engaging the shoulder formed for reacting tension loads carried through the nut from the vise screw shaft to the modular actuator assembly back to the main body of the machine vise.

* * * * *

UNITED STATES PATENT AND TRADEMARK OFFICE
CERTIFICATE OF CORRECTION

PATENT NO. : 4,949,943

DATED : August 21, 1990

INVENTOR(S) : Leon M. Bernstein

It is certified that error appears in the above-identified patent and that said Letters Patent is hereby corrected as shown below:

Col. 6, line 60, after "screw", insert --shaft--.

Signed and Sealed this

Twelfth Day of November, 1991

*Attest:*

HARRY F. MANBECK, JR.

*Attesting Officer*

*Commissioner of Patents and Trademarks*